US008888657B2

(12) United States Patent
Kitao et al.

(10) Patent No.: US 8,888,657 B2
(45) Date of Patent: Nov. 18, 2014

(54) CONTROL APPARATUS OF WORKING VEHICLE AND CONTROL METHOD THEREOF

(75) Inventors: Shinichi Kitao, Naka-gun (JP); Atsushi Shirao, Komatsu (JP)

(73) Assignee: Komatsu Ltd., Tokyo (JP)

( * ) Notice: Subject to any disclaimer, the term of this patent is extended or adjusted under 35 U.S.C. 154(b) by 71 days.

(21) Appl. No.: 13/814,782

(22) PCT Filed: Apr. 17, 2012

(86) PCT No.: PCT/JP2012/060381
§ 371 (c)(1),
(2), (4) Date: Feb. 7, 2013

(87) PCT Pub. No.: WO2012/147572
PCT Pub. Date: Nov. 1, 2012

(65) Prior Publication Data
US 2013/0136624 A1  May 30, 2013

(30) Foreign Application Priority Data
Apr. 27, 2011  (JP) ................. 2011-100048

(51) Int. Cl.
| F16H 61/00 | (2006.01) |
| F16H 61/44 | (2006.01) |
| E02F 9/22 | (2006.01) |
| E02F 9/20 | (2006.01) |
| F16H 61/431 | (2010.01) |
| F16H 61/4035 | (2010.01) |
| F16H 61/444 | (2010.01) |

(52) U.S. Cl.
CPC .............. *E02F 9/2221* (2013.01); *F16H 61/44* (2013.01); *E02F 9/2296* (2013.01); *E02F 9/2079* (2013.01); *E02F 9/2235* (2013.01); *F16H 61/431* (2013.01); *E02F 9/2289* (2013.01); *F16H 61/4035* (2013.01); *E02F 9/2253* (2013.01); *E02F 9/2292* (2013.01); *F16H 61/444* (2013.01)

USPC .......................................................... 477/168

(58) Field of Classification Search
USPC ................... 477/168, 169, 174, 181
See application file for complete search history.

(56) References Cited

U.S. PATENT DOCUMENTS

| 5,725,455 A * | 3/1998 | Kamada et al. .................. 477/62 |
| 7,677,350 B2 * | 3/2010 | Shirao et al. .................. 180/305 |
| 7,971,434 B2 | 7/2011 | Ishizaki et al. |
| 8,277,364 B2 | 10/2012 | Hyodo et al. |
| 8,287,433 B2 * | 10/2012 | Kishii ........................... 477/181 |

FOREIGN PATENT DOCUMENTS

| CN | 101223383 | 7/2008 |
| CN | 101606010 | 12/2009 |

(Continued)

OTHER PUBLICATIONS

International Search Report dated Jun. 5, 2012, issued for PCT/JP2012/060381.

*Primary Examiner* — Edwin A Young
(74) *Attorney, Agent, or Firm* — Edwards Wildman Palmer LLP

(57) ABSTRACT

A control apparatus of a working vehicle including a hydraulic pump driven by an engine and two hydraulic motors connected in parallel to the hydraulic pump, a clutch being released or engaged so that a power is transmitted to one of the hydraulic motors via the clutch, includes: a load detection unit determining a load of the working vehicle from a throttle output amount and an engine speed of the engine; and a control unit reducing a pump injection amount of the hydraulic pump under an upper limit injection amount of the hydraulic pump predetermined based on the load at a time of release shift control of the clutch and increasing a pump injection amount of the hydraulic pump under a lower limit injection amount of the hydraulic pump predetermined based on the load at a time of engagement shift control of the clutch.

6 Claims, 11 Drawing Sheets

(56) References Cited

FOREIGN PATENT DOCUMENTS

| | | |
|---|---|---|
| JP | 09-125464 A | 5/1997 |
| JP | 09-310747 | 12/1997 |
| JP | 11-166623 | 6/1999 |
| JP | 11-166628 | 6/1999 |
| JP | 11-230333 A | 8/1999 |
| JP | 2000-081109 | 3/2000 |
| JP | 2001-304408 A | 10/2001 |
| JP | 2001-336602 A | 12/2001 |
| JP | 2008-190637 A | 8/2008 |

* cited by examiner

FIG.10

| PRESENT STATE | PRESENT VEHICLE STATUS | TRANSITION CONDITION TO NEXT STATUS (CONDITION A) or (CONDITION B) | | | | NEXT VEHICLE STATUS |
|---|---|---|---|---|---|---|
| | | CONDITION A (THREE ANDs) | | | CONDITION B | |
| | | SELECTED OPERATION FORWARD/ BACKWARD | VEHICLE SPEED SENSOR ROTATING DIRECTION | OUTPUT SHAFT SPEED | OUTPUT SHAFT SPEED | |
| WHILE BEING STOPPED | 0 | F | - | >Vzero | - | 1 |
| | | R | - | >Vzero | - | 2 |
| FORWARD | 1 | F | - | <=Vzero | - | 0 |
| | | N | - | - | - | 5 |
| | | R | - | - | - | 3 |
| BACKWARD | 2 | F | - | - | - | 4 |
| | | N | - | - | - | 6 |
| | | R | - | <=Vzero | - | 0 |
| FR SHUTTLE | 3 | F | - | - | - | 1 |
| | | N | - | - | - | 5 |
| | | R | R | <=Vs | <=Vzero | 0 |
| RF SHUTTLE | 4 | F | F | <=Vs | <=Vzero | 0 |
| | | N | - | - | - | 6 |
| | | R | - | - | - | 2 |
| FORWARD N STOP | 5 | F | - | - | - | 1 |
| | | N | - | <=Vzero | - | 0 |
| | | R | - | - | - | 3 |
| BACKWARD N STOP | 6 | F | - | - | - | 4 |
| | | N | - | <=Vzero | - | 0 |
| | | R | - | - | - | 2 |

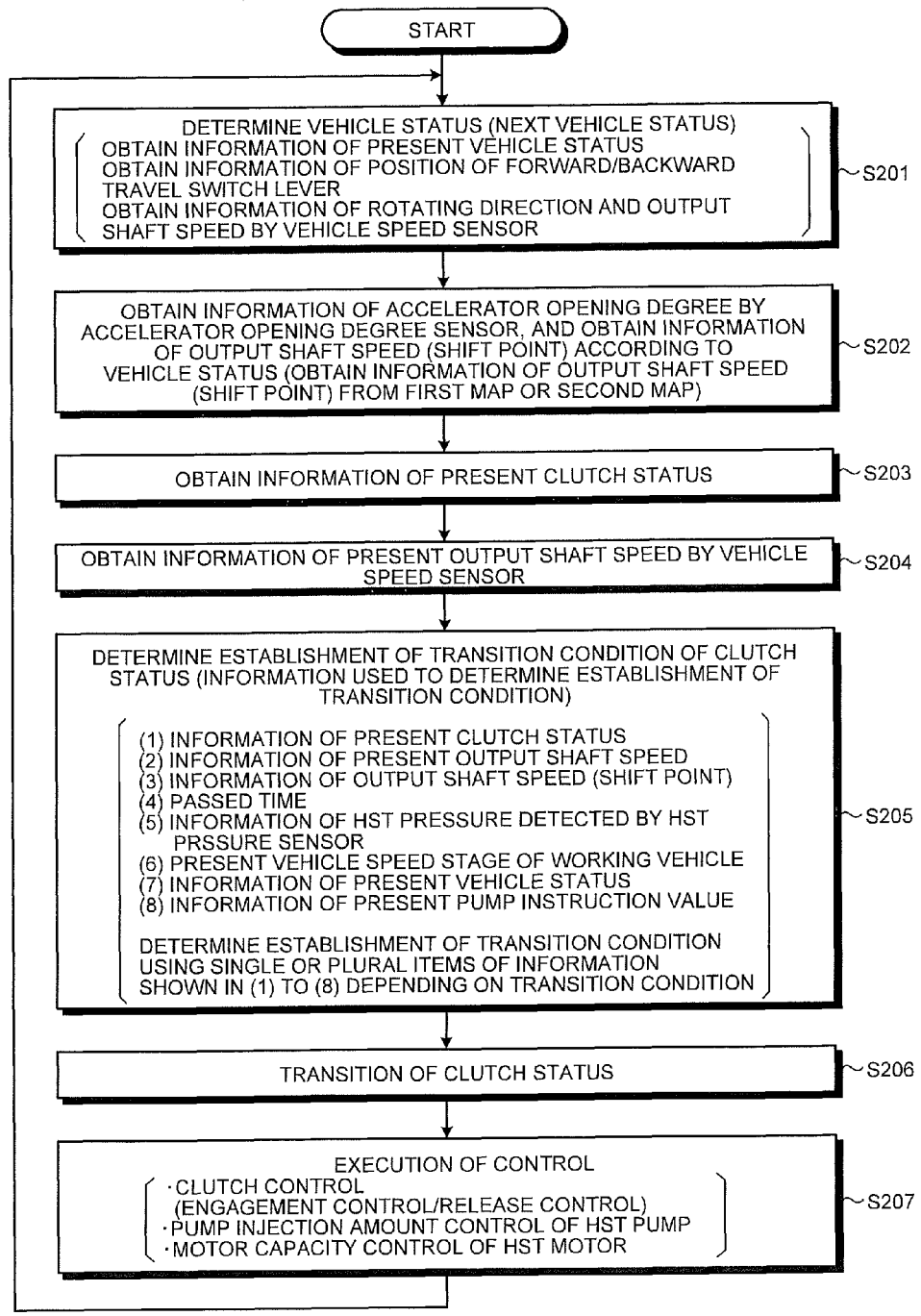

CONTROL APPARATUS OF WORKING VEHICLE AND CONTROL METHOD THEREOF

FIELD

The invention relates to a control apparatus of a working vehicle in which a hydraulic pump driven by an engine is connected to two hydraulic motors driven by a hydraulic oil injected from the hydraulic pump in a closed hydraulic circuit, the two hydraulic motors are connected in parallel to the hydraulic pump, a clutch is released or engaged so that power is transmitted from one of the hydraulic motors to an output shaft via the clutch, and the working vehicle travels by a drive force (hereinafter, called power) of the one or two hydraulic motors and to a control method of the control apparatus.

BACKGROUND

Conventionally, there is known a construction machine such as a wheel loader and a working vehicle such as an agricultural machine, an industrial vehicle, and the like provided with a hydrostatic transmission (HST). The working vehicle provided with the HST has such a configuration that a hydraulic pump is caused to communicate with a hydraulic motor via a closed hydraulic circuit and the working vehicle travels by power of the hydraulic motor. Recently, working efficiency can be improved and a fuel can be saved by driving an engine, a hydraulic pump, and a hydraulic motor by an optimum output, pump capacity and motor capacity by an electronic control technology.

As a working vehicle provided with the HST, there is, for example, a working machine which has two hydraulic motors connected in parallel to a hydraulic pump, a clutch is connected to only one hydraulic motor, and power is transmitted to four wheels via a power transmission mechanism such as an axle. The HST is a so-called one-pump/two-motors HST. The one-pump/two-motors HST may be employed when a large hydraulic motor cannot be manufactured or when a location in which a large hydraulic motor is installed is not available on a working vehicle. Further, the one-pump/two-motors HST may be employed because of a reason that when a large hydraulic motor is used, it is difficult to execute prompt response control to inertia due to a rotation of the hydraulic motor and a mechanical resistance also becomes large. In the one-pump/two-motors HST, when a working vehicle travels at a low speed, the working vehicle is driven by two hydraulic motors, whereas when the working vehicle has reached a high speed travel region, the working vehicle travels by power of only one hydraulic motor by releasing a clutch connected to the other one hydraulic motor.

CITATION LIST

Patent Literature

Patent Literature 1: Japanese Laid-open Patent Publication No. 11-230333

SUMMARY

Technical Problem

An HST pump (travel hydraulic pump) uses, for example, a swash plate variable capacity piston pump so that an injection amount of a hydraulic oil injected from the HST pump can be changed by changing a tilt angle of a swash plate. A recent working vehicle is controlled to execute a work and a travel by matching a travel hydraulic pump or a working hydraulic pump in a low speed region of an engine output to reduce fuel consumption in comparison with a conventional working vehicle. With the operation, pump absorption torque of an HST pump (travel hydraulic pump) becomes large. Accordingly, a swash plate angle of the HST pump is increased to obtain an injection amount of the hydraulic oil of the HST pump as large as that of a conventional working vehicle even in the low speed region. As a result, in the low speed region, torque of the HST pump, that is, a pressure generated in the hydraulic oil of the HST pump becomes large. Since the one-pump/two-motors HST does not use a large hydraulic pump, the one-pump/two-motors HST is compact and has good responsiveness. However, since the one-pump/two-motors HST uses a clutch and the pressure of the hydraulic oil described above is increased, it is considered that a shock, by which a working vehicle is abruptly decelerated or accelerated via a hydraulic circuit, hydraulic equipment, and the like, is generated by accelerated wear of the clutch, a damage of the hydraulic equipment, and an occurrence of a surge pressure of a hydraulic pressure when the clutch is engaged or released and that a problem arises in durability of the working vehicle and driving feeling. Further, when a low speed travel shifts to a high speed travel, although the clutch is released, since the HST motor itself has become compact, it is considered that a problem in driving feeling arises in that a gear shift ratio before and after the clutch is released becomes large as compared with a conventional gear shift ratio and acceleration feeling abruptly occurs after the clutch has been released.

An object of the invention, which was made in view of the above problems, is to provide a control apparatus of a working vehicle capable of suppressing an abrupt variation of a hydraulic pressure such as an occurrence of a surge pressure of a hydraulic pressure when the working vehicle travels, preventing a damage of a clutch, a hydraulic circuit, and hydraulic equipment by suppressing a shock when the clutch is released and engaged, and giving good driving feeling to an operator by a smooth clutch operation while keeping low fuel consumption by the working vehicle and to provide a control method of the working vehicle.

Solution to Problem

To achieve the object mentioned above, according to the present invention, a control apparatus of a working vehicle comprising a hydraulic circuit which is a closed circuit having a hydraulic pump driven by an engine and two hydraulic motors and in which the two hydraulic motors are connected in parallel to the hydraulic pump, a clutch being released or engaged so that a power is transmitted to an output shaft of one of the hydraulic motors via the clutch in the working vehicle, the working vehicle traveling by a drive force of the one or two hydraulic motors, the control apparatus comprises: a load detection unit configured to determine a working vehicle load of the working vehicle from a throttle output amount and an engine speed of the engine; and a control unit configured to execute control for reducing a pump injection amount of the hydraulic pump under a restriction of an upper limit injection amount of the hydraulic pump predetermined based on the working vehicle load determined by the load detection unit at a time of release shift control of the clutch and execute control for increasing a pump injection amount of the hydraulic pump under a restriction of a lower limit injection amount of the hydraulic pump predetermined based on the working vehicle load determined by the load detection unit at a time of engagement shift control of the clutch.

According to the present invention, the working vehicle load is determined based on the engine speed and an accelerator opening degree or an intake manifold pressure.

According to the present invention, the control unit determines the time of release shift control and the time of engagement shift control of the clutch based on a clutch status indicating a clutch state including a released state, a while-being-released state, an engaged state, and a while-being-engaged state of the clutch.

According to the present invention, the clutch status transits based on a vehicle status indicating a transition of a travel state of the working vehicle and a speed of the output shaft determined based on an accelerator opening degree.

According to the present invention, a control method of a working vehicle comprising a hydraulic circuit which is a closed circuit having a hydraulic pump driven by an engine and two hydraulic motors and in which the two hydraulic motors are connected in parallel to the hydraulic pump, a clutch being released or engaged so that a power is transmitted to an output shaft of one of the hydraulic motors via the clutch in the working vehicle, the working vehicle traveling by a drive force of the one or two hydraulic motors, the control method comprises: determining a working vehicle load of the working vehicle from a throttle output amount and an engine speed of the engine; and executing control for reducing a pump injection amount of the hydraulic pump under a restriction of an upper limit injection amount of the hydraulic pump predetermined based on the working vehicle load determined at a time of release shift control of the clutch and executing control for increasing a pump injection amount of the hydraulic pump under a restriction of a lower limit injection amount of the hydraulic pump predetermined based on the working vehicle load determined at a time of engagement shift control of the clutch.

According to the present invention, the working vehicle load is determined based on the engine speed and an accelerator opening degree or an intake manifold pressure.

According to the invention, when the working vehicle travels, since control for reducing an injection amount of a hydraulic pump under the restriction of the upper limit injection amount of the hydraulic pump predetermined based on the working vehicle load at the time of release shift control of the clutch and control for increasing the injection amount of the hydraulic pump under the restriction of a lower limit injection amount of the hydraulic pump predetermined based on the working vehicle load at the time of engagement shift control of the clutch are performed, the working vehicle can give good driving feeling to an operator together with good responsiveness of the clutch by executing a smooth clutch operation by suppressing a damage to the clutch, a hydraulic circuit or hydraulic equipment when the clutch is released and engaged and suppressing a shock due to an abrupt pressure variation of a hydraulic pressure while keeping low fuel consumption.

BRIEF DESCRIPTION OF DRAWINGS

FIG. 10 is a view illustrating a vehicle status and a transition condition of the vehicle status.

FIG. 13 is an explanatory view explaining an outline of control executed in a control apparatus and a control method according to the embodiment.

DESCRIPTION OF EMBODIMENTS

An embodiment for embodying the invention will be explained below referring to accompanying drawings.

Overall Configuration

Figure 1:
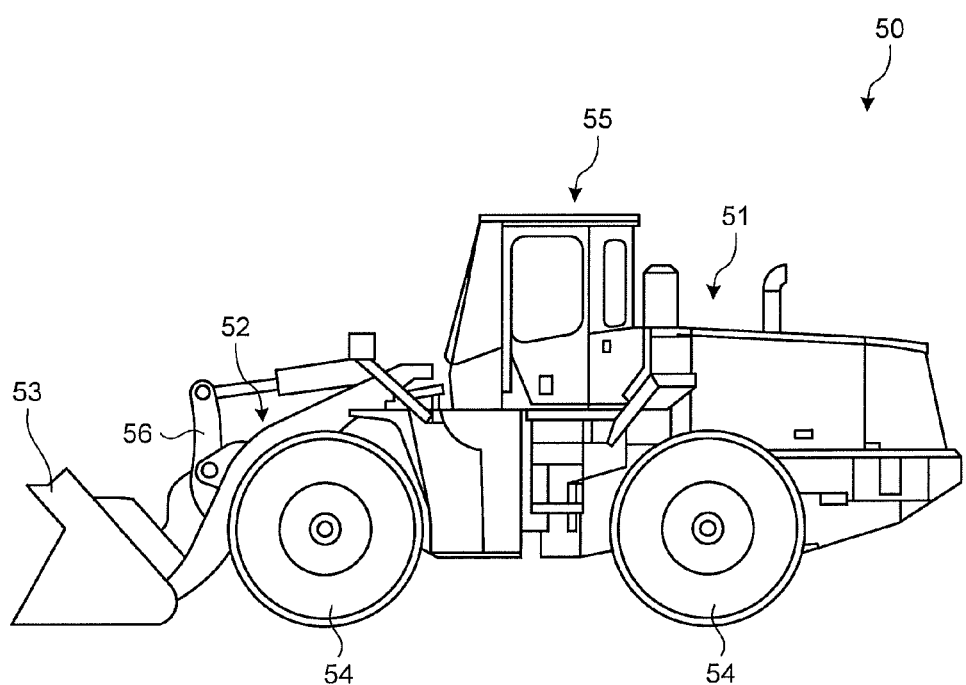
FIG. 1 is a view illustrating an overall configuration of a wheel loader according to an embodiment of the invention.
Figure 2:
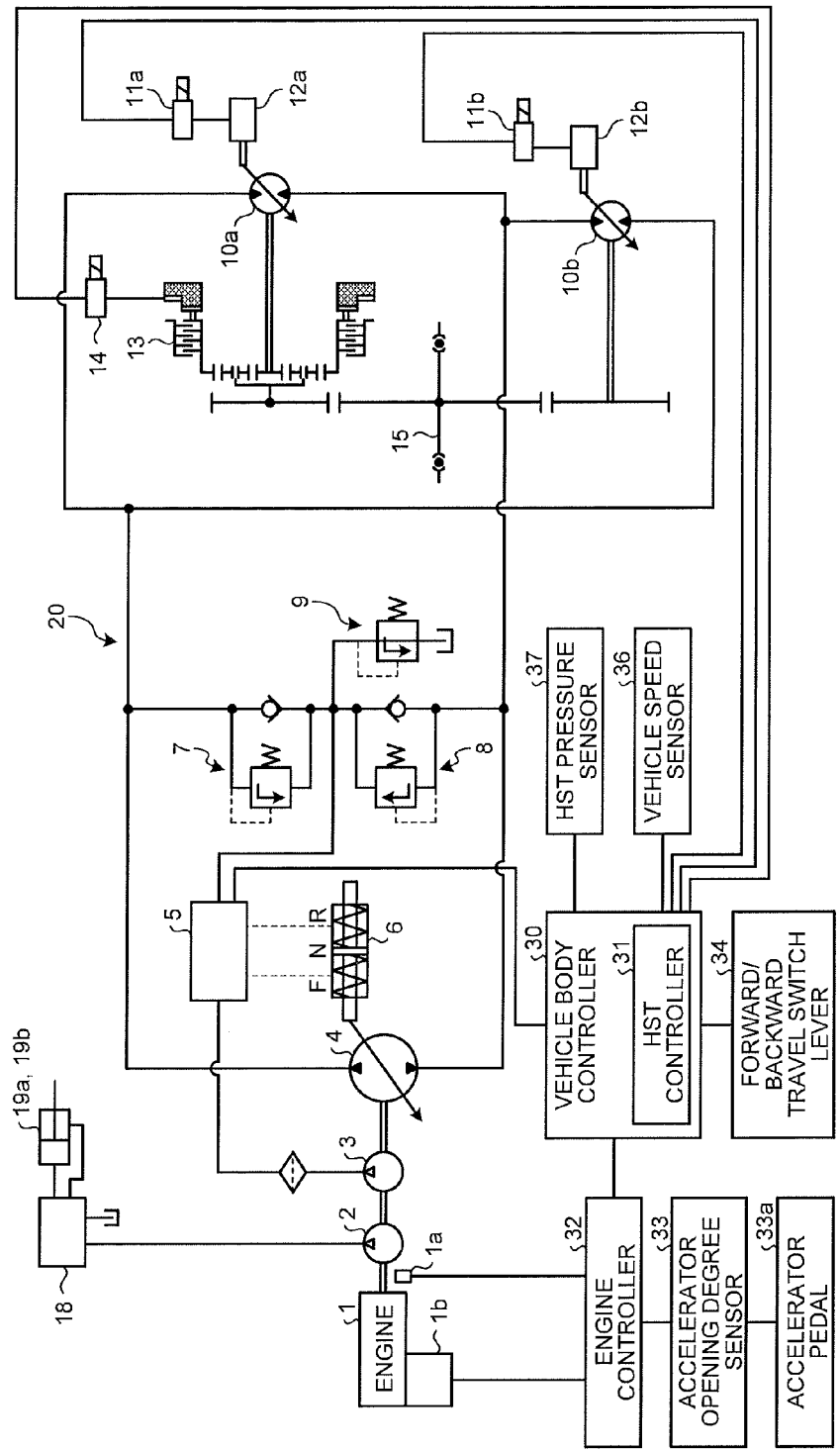
FIG. 2 is a view illustrating a circuit configuration mainly illustrating a drive system of the wheel loader according to the embodiment of the invention.

FIG. 1 is a view illustrating an overall configuration of a wheel loader 50 as an example of a working vehicle. Further, FIG. 2 is a view illustrating a circuit configuration mainly illustrating a drive system of the wheel loader 50. As illustrated in FIG. 1, the wheel loader 50 has a working machine composed of a vehicle body 51, a bucket 53 attached to a lift arm 52 mounted on a front section of the vehicle body 51 and to an extreme end of the lift arm 52, a bell crank 56, and the like, four tires 54 for causing the vehicle body 51 to travel by rotating while supporting the vehicle body 51, and a cab (driver's cabin) 55 mounted to an upper section of the vehicle body 51.

The vehicle body 51 has an engine room for accommodating an engine 1, working machine hydraulic cylinders 19a, 19b for operating the lift arm 52 and the bell crank 56, a control valve 18 for controlling the working machine hydraulic cylinders 19a, 19b, and a vehicle body controller 30 for controlling actuators of the working machine hydraulic cylinders 19a, 19b, a working machine hydraulic pump 2, an HST pump (travel hydraulic pump) 4, travel hydraulic motors 10a, 10b, and the like. Further, as illustrated in FIG. 2, the vehicle body 51 is mounted with the engine 1, the vehicle body controller 30, an engine controller 32, and the like. The lift arm 52 is a link member for lifting the bucket 53 attached to the extreme end thereof and operates up and down by that the working machine hydraulic cylinder (lift cylinder) 19a coupled with the lift arm 52 expands and contracts. Further, the bucket 53 is attached to the extreme end of the lift arm 52 and dumps and tilts by that the working machine hydraulic cylinder (bucket cylinder) 19b coupled with the bucket 53 via a link member called the bell crank 56 further expands and contracts.

Circuit Configuration

As illustrated in FIG. 2, the wheel loader 50 has an HST circuit 20 for causing the wheel loader 50 to travel by driving the HST motors (travel hydraulic motors) 10a, 10b by hydraulic oil injected from the HST pump (travel hydraulic pump) 4 driven by the engine 1. The HST circuit 20 is a one-pump/two-motors HST system in which the two HST motors 10a, 10b are connected to the HST pump 4 in parallel and a closed hydraulic circuit is configured. Further, at the time of the low speed travel, the HST circuit 20 causes the wheel loader 50 to travel by transmitting power to an output shaft 15 by driving the two HST motors 10a, 10b, whereas, at the time of high speed travel, the HST circuit 20 causes the wheel loader 50 to travel by driving only the HST motor 10b by disconnecting the transmission of the power from the HST motor 10a to the output shaft 15 by releasing a clutch 13.

The wheel loader 50 has a working machine side mechanism including the working machine hydraulic pump 2 driven by the engine 1, a travel side mechanism including the HST pump 4 driven by the engine 1, and a hydraulic drive mechanism including the engine controller 32 and the vehicle body controller 30 for controlling the working machine side mechanism and the travel side mechanism.

The hydraulic drive mechanism has the engine 1, the working machine hydraulic pump 2, a charge pump 3, the HST pump 4, the HST motors 10a, 10b, the clutch 13, the engine controller 32, the vehicle body controller 30, an accelerator opening degree sensor 33, a forward/backward travel switch lever 34, a vehicle speed sensor 36, an HST pressure sensor 37, and the HST circuit 20. The forward/backward travel switch lever 34 is disposed near to a steering column of the cab 55 (driver's cabin) and can be switched to forward travel (F), backward travel (R), neutral (N) by being operated by an operator, and a position of the switched lever is electrically detected. Further, a speed stage switch capable of setting a vehicle speed stage of the wheel loader 50 is disposed near to the steering column. The speed stage switch may be an independent dial switch and button switch or may be additionally attached to the forward/backward travel switch lever 34. When the speed stage switch is operated by the operator, a position of a set speed stage is electrically detected.

The engine 1 is a diesel engine, and output torque generated by the engine 1 is transmitted to the working machine hydraulic pump 2, the charge pump 3, the HST pump 4, and the like. The engine 1 is connected with the engine controller 32 for controlling the output torque and a speed of the engine 1. The engine controller 32 adjusts a fuel injection amount according to an accelerator opening degree which is an operation amount of an accelerator pedal 33a. Further, the engine 1 has an engine speed sensor 1a for detecting an actual speed of the engine 1 and inputs a speed signal of the engine speed sensor 1a to the engine controller 32. Further, the engine 1 is connected with a fuel injection device 1b. The engine controller 32 adjusts the engine torque and the engine speed by controlling a fuel injection amount according to the accelerator opening degree. Note that a common rail fuel injection system composed of, for example, a fuel pump, a common rail, an injector, and the like are used as the fuel injection device 1b.

The accelerator pedal 33a is disposed below an operator's seat of the cab 55, and the operator of the wheel loader 50 adjusts a depression amount of the accelerator pedal 33a by executing a foot depressing operation. The accelerator pedal 33a is attached with the accelerator opening degree sensor 33 for detecting the depression amount (throttle output amount) of the accelerator pedal 33a. The accelerator opening degree sensor 33 is realized by a potentiometer and the like and outputs a detected accelerator opening degree to the engine controller 32. The engine controller 32 controls the fuel injection device 1b according to the input accelerator opening degree and adjusts the fuel injection amount to the engine 1. Note that the throttle output amount to the engine 1 may be determined by an operation means such as an operation lever and a dial capable of being manually operated by the operator in place of the accelerator pedal 33a.

The HST pump 4 is a variable capacity hydraulic pump (for example, a swash-plate variable-capacity piston pump) driven by the engine 1. The hydraulic oil injected from the HST pump 4 is sent to the HST motors 10a, 10b, respectively via the HST circuit 20 including high pressure relief valves 7, 8 and a low pressure relief valve 9. Note that a pressure of the hydraulic oil in a hydraulic pipe of the HST circuit 20 (hereinafter, called an HST pressure) is detected by the HST pressure sensor 37 disposed in the HST circuit 20, and a signal indicating a detect pressure is input to a HST controller 31 in the vehicle body controller 30. Further, the HST pump 4 is connected with a pump control valve 5 for controlling a swash plate angle for controlling a capacity of the HST pump 4 and a flow direction of the hydraulic oil and a pump capacity control cylinder 6 for driving a swash plate in response to a control instruction of the pump control valve 5.

The HST motors 10a, 10b are a variable capacity hydraulic motor. The respective HST motors 10a, 10b are driven by the hydraulic oil injected from the HST pump 4 and outputs power for causing the wheel loader 50 to travel. The HST motors 10a, 10b have motor cylinders 12a, 12b for controlling the swash plate angle, respectively and motor control electronic servo valves 11a, 11b for controlling the motor cylinders 12a, 12b, respectively. The motor control electronic servo valves 11a, 11b are an electromagnetic control valve that operates in response to a control signal transmitted from the HST controller 31 in the vehicle body controller 30 and control and operate the motor cylinders 12a, 12b, respectively. As described above, a motor capacity of the HST motors 10a, 10b can be optionally changed.

The clutch 13 is controlled so as to be released or engaged by driving a clutch control valve 14 in response to a control signal transmitted from the HST controller 31. The HST motor 10a transmits the power to the output shaft 15 or disconnects the transmission of the power by releasing or engaging the clutch 13. In contrast, the HST motor 10b transmits power to the output shaft 15 at all times.

The vehicle speed sensor 36 is a sensor for detecting a speed of the output shaft 15, that is, a vehicle speed of the wheel loader 50. Note that the vehicle speed sensor 36 may detect the vehicle speed from a speed of the tires 54 by appropriately determining a location where the vehicle speed sensor 36 is installed.

Note that the charge pump 3 is a pump that is driven by the engine 1 and supplies the hydraulic oil to the HST circuit 20. Further, the charge pump 3 supplies the hydraulic oil to a pilot circuit of the HST pump 4.

An HST controller 31 in the vehicle body controller 30 controls a pump injection amount as an injection amount of the hydraulic oil of the HST pump 4 (when an engine speed is given, the pump injection amount is a pump capacity because the following expression, i.e., a relation of pump injection amount=engine speed×pump capacity is established) and a motor capacity of the HST motors 10a, 10b as well as controls the release and the engagement of the clutch 13 based on an HST pressure detected by the HST pressure sensor 37, the accelerator opening degree input via the engine controller 32, a speed signal (engine speed) input from the engine speed sensor 1a, a forward/backward travel signal determined by an operating position of the forward/backward travel switch lever 34 operated by the operator, a speed signal (output shaft speed) input from the vehicle speed sensor 36, and the like. Note that the engine controller 32 and the vehicle body controller 30 are connected mutually and can transmit and receive information such as data and a signal therebetween.

Outline of Clutch Release/Engagement Control

Figure 3:
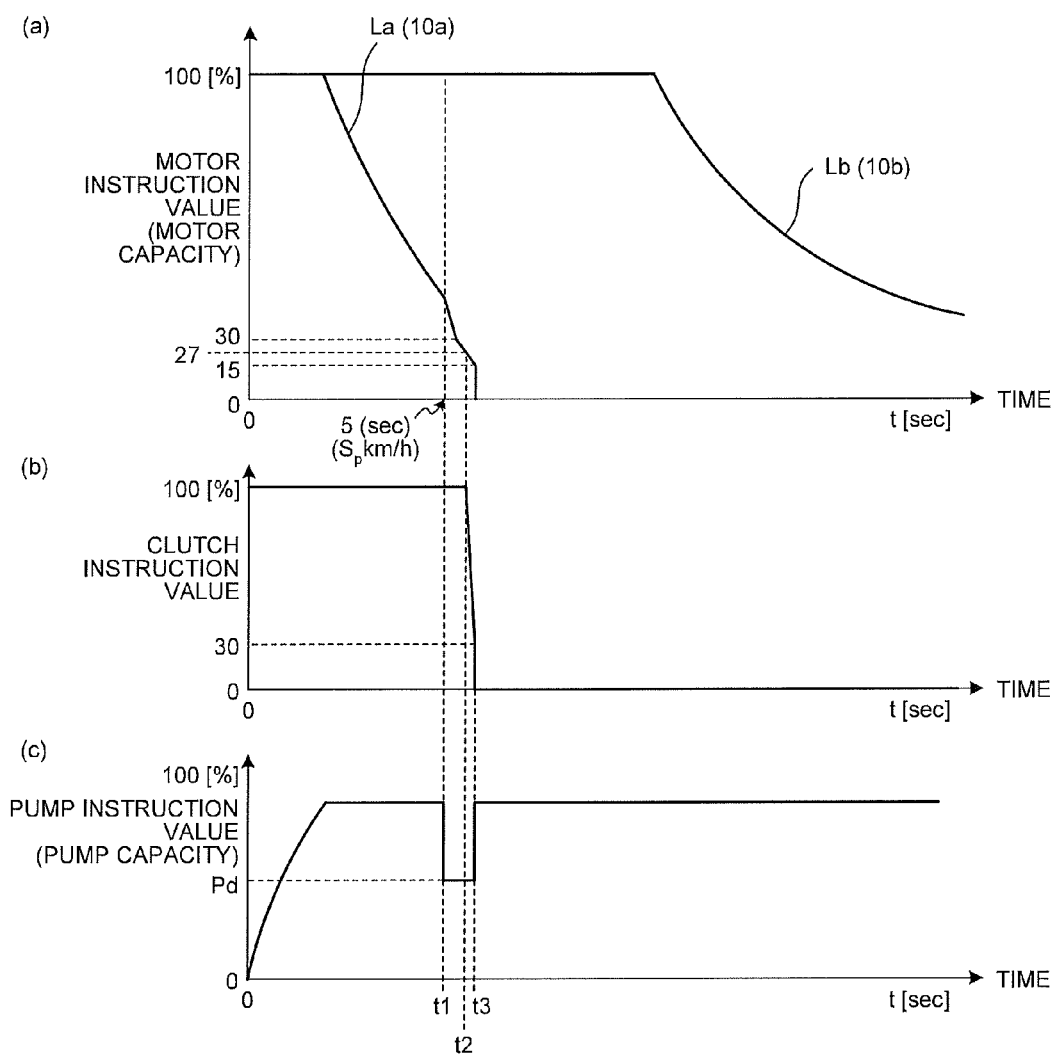
FIG. 3 is a time chart illustrating control processes at the time of clutch release shift.

Here, an outline of control at the time of clutch release shift and an outline of control at the time of clutch engagement shift executed by the HST controller 31 will be explained. First, control at the time of clutch release shift in which the clutch 13 is shifted from an engaged state to a released state will be explained referring to a time chart illustrated in FIG. 3. FIG. 3 (a) illustrates a change of motor instruction values, which are instructed to the HST motors 10a, 10b, to a time (vehicle speed), and a characteristics line La illustrates the motor instruction value to the HST motor 10a and a characteristics line Lb illustrates the motor instruction value to the HST motor 10b. FIG. 3(b) illustrates a change of a clutch instruction value for instructing the released state and the engaged state of the clutch 13 to the time (vehicle speed). Here, it means to release the clutch 13 that the clutch instruction value is 0% and it means to perfectly engage the clutch 13 that the clutch instruction value is 100%. FIG. 3(c) illustrates a change of a pump instruction value, which is instructed to the HST pump 4, to the time (vehicle speed). Note that, in FIG. 3, as the time progresses from 0the time (vehicle speed) of the wheel loader 50 shifts from a low speed travel to a high speed travel. First, when the wheel loader 50 starts to travel by increasing the accelerator opening degree by that the operator depresses the accelerator pedal 33a in the engaged state of the two HST motors 10a, 10b, since a load is increased, the pump instruction value is increased up to 100% (here, the swash plate angle is tilted up to 100% (up to a maximum pump capacity)), thereby outputting a large amount of torque together with a large pump injection amount. When the vehicle speed has reached a shift point of Sp (km/h) at a time t1 after, for example, five seconds had passed, since a release preparation state is achieved, the pump instruction value of 100% at time t1 becomes a pump instruction value Pd which is a value smaller than an upper limit Pd which will be described later and is smaller than a pump instruction value just before (FIG. 3(c)), thereby the pump injection amount of the HST pump 4 is suppressed. Further, the motor instruction value of the HST motor 10a (motor capacity determined by the tilt angle of the swash plate angle) is gradually reduced as the vehicle speed increases as illustrated in FIG. 3(a). The clutch instruction value of 100% is gradually reduced (modulation) from a time t2 at which the motor capacity has become 27%, and, at a time t3 at which the clutch instruction value has becomes 30%, the clutch instruction value is reduced to 0% instantly assuming that the clutch 13 has been perfectly released (FIG. 3(b)). At the time t3, since the clutch 13 has been released, the pump instruction value is caused to increase up to 100% without receiving the restriction of the upper limit Pd from the time t3 (FIG. 3(c)).

That is, until during a period of time t1 to time t3 which is at the time of clutch release shift in which the clutch 13 shifts from the engaged state to the released state, the pump capacity is reduced by suppressing the pump instruction value, the pump injection amount corresponding to the pump capacity which is not necessary to be supplied to the HST motor 10a whose power transmission to the output shaft 15 is disconnected is reduced to thereby suppress a shock by suppressing a generation of a surge pressure of a hydraulic pressure in the hydraulic circuit, thereby a smooth clutch operation with good responsiveness is realized. Accordingly, a damage of hydraulic equipment and the hydraulic pipe can be further prevented by suppressing a friction of the clutch 13 due to a large amount of torque at the time of clutch release shift. Further, since the smooth clutch operation suppresses an abrupt acceleration when the clutch is released, good driving feeling can be given to the operator. Note that since the upper limit Pd of the pump instruction value, by which a pump injection amount of the HST pump 4 is suppressed when the clutch is released, is predetermined according to a load of the working vehicle, the pump instruction value is caused not to exceed the upper limit Pd. As described above, since the pump injection amount supplied to the HST motor 10a is suppressed before the clutch is released (before the time t3) by causing the pump instruction value not to exceed the upper limit Pd, a motor capacity of the HST motor 10a is reduced. Since the motor capacity of the HST motor 10a is reduced, it becomes unnecessary to inject the hydraulic oil from the HST pump 4 by the amount corresponding to the reduced motor capacity. That is, unless the pump instruction value is caused not to exceed the upper limit Pd when the clutch is released, since an excessive hydraulic oil is injected from the HST pump 4 to the HST motor 10a, the hydraulic oil which loses its destination becomes a cause for generating the surge pressure. In contrast, a degree of the load of the working vehicle is determined by a relation between the engine speed and the accelerator opening degree. The upper limit Pd of the pump instruction value which is predetermined according to the degree of the load is stored in a memory of the HST controller 31. When, for example, the degree of the load is determined from the engine speed and the accelerator opening degree at a certain time, if the upper limit Pd corresponding to the degree of the load is 70%, the pump instruction value is set to a value that does not exceed 70%.

Figure 4:
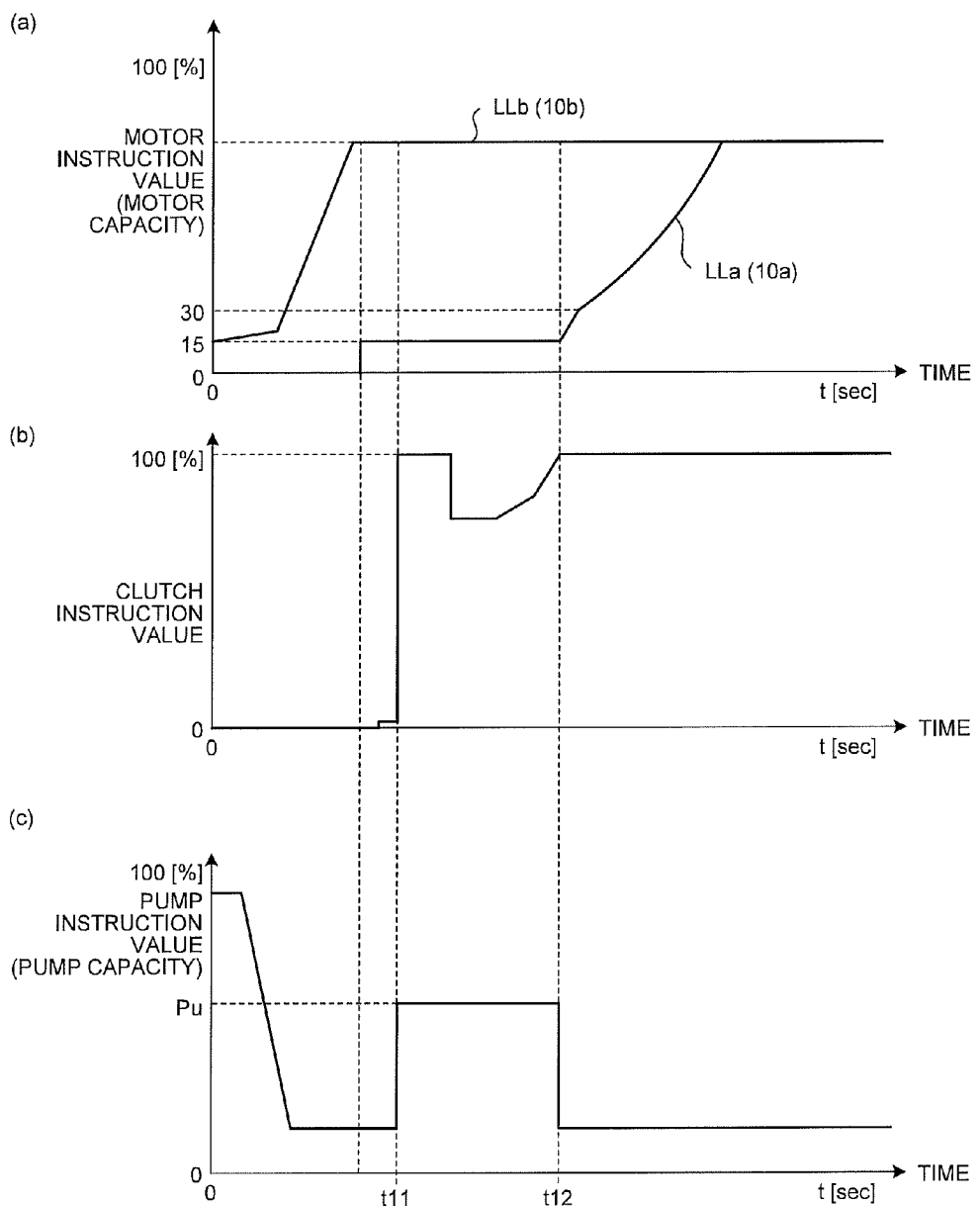
FIG. 4 is a time chart illustrating control processes at the time of clutch engagement shift.

Next, control at the time of clutch engagement shift in which the clutch 13 is shifted from the released state to the engaged state will be explained referring to a time chart illustrated in FIG. 4. FIG. 4(a) illustrates a change of the motor instruction values, which are instructed to the HST motors 10a, 10b, to a time (vehicle speed), and a characteristics line LLa illustrates the motor instruction value to the HST motor 10a and a characteristics line LLb illustrates the motor instruction value to the HST motor 10b. FIG. 4(b) illustrates a change of the clutch instruction value (target value) for instructing the released state and the engaged state of the clutch to the time (vehicle speed). FIG. 4(c) illustrates a change of the pump instruction value, which instructed to the HST pump 4, to the time (vehicle speed). Note that, in FIG. 4, as the time progresses from 0, the vehicle speed of the wheel loader 50 shifts from the high speed travel to the low speed travel. In contrast, as illustrated in FIG. 4, in control at the time of clutch engagement shift in which the clutch 13 is shifted from the released state to the engaged state, when the wheel loader 50 is decelerated from the high speed travel to a decelerating travel in the state that a power of the HST motor 10a is not transmitted to the clutch 13 (the clutch 13 is in the released state) in the state that the HST motor 10b transmits power to the output shaft 15, that is, when the accelerator opening degree is reduced by that the operator operates the accelerator pedal 33a and reduces the depression amount of the accelerator pedal 33a, the pump instruction value to the HST pump 4 is reduced as illustrated in FIG. 4(c). Thereafter, until during a period from time t11 at which the clutch 13 starts to shift from the released state to the engaged state to time t12 at which the engaged state is completed, the clutch instruction value is increased from a vicinity of 0% to 100% and the clutch 13 is engaged (FIG. 4(b)). The clutch instruction value is the target value, the clutch instruction value which is increased (to, for example, 100%) is output for a slight time from time t11, the clutch instruction value is reduced after the slight time, and as a time passes to time t12, the clutch instruction value is increased to 100%. Accordingly, an actual degree of engagement of the clutch 13 makes a response slightly later than the clutch instruction value so that the clutch 13 gradually shifts from the released state to the engaged state. During the period of time t11 to time t12, the pump instruction value is made to a pump instruction value which is a value larger than a predetermined lower limit Pu and is increased than a pump instruction value just before (FIG. 4(c)). After time t12, the pump instruction value becomes a value just before time t11. Further, after time t12, the clutch 13 is engaged and the motor instruction value (motor capacity) of the HST motor 10a is increased as illustrated in the characteristics line LLa (FIG. 4(a)).

That is, until during the period of time t11 to time t12 which is at the time of engagement shift for shifting the clutch 13 from the released state to the engaged state, the pump instruction value is increased to thereby increase the pump capacity (pump injection amount) of the HST pump 4. As the wheel loader 50 is decelerated, although the clutch 13 is engaged and the power output from the HST motor 10a is transmitted to the output shaft 15, the pump instruction value is increased until time t12 by the amount of the hydraulic oil (corresponding to the pump capacity) which is necessary to be supplied to the HST motor 10a so that the hydraulic oil to be supplied from the HST pump 4 to the HST motor 10a is secured before the clutch 13 is engaged. Accordingly, at the time of clutch engagement, since the HST motor 10a is driven with good responsiveness, the smooth clutch operation is realized with a good responsiveness while suppressing a shock by suppressing an occurrence of abrupt variation of the hydraulic pressure in the HST motor 10b and the like. Note that the lower limit Pu according to the load of the working vehicle is predetermined to the increased pump instruction value, and the increased pump instruction value is made not to become lower than the lower limit Pu. As described above, since the pump instruction value is made not to become lower than the lower limit Pu, a pressure and an amount of the hydraulic oil supplied to the HST motor 10a are secured and the HST motor 10a can be certainly driven. In contrast, the degree of the load of the working vehicle is determined by a relation between the engine speed and the accelerator opening degree. The upper limit Pu of the pump instruction value which is predetermined according to the degree of the load is stored in the memory of the HST controller 31. When, for example, the degree of the load is determined from the engine speed and the accelerator opening degree at a certain time, if the lower limit Pu corresponding to the degree of the load is 70%, the pump instruction value is set to a value that does not become lower than 70%.

In the embodiment, at the time of clutch release shift, the pump injection amount is reduced in a range in which the pump injection amount does not exceed the predetermined upper limit. Since the pump injection amount supplied to the HST motor 10a whose power transmission to the output shaft 15 is disconnected is suppressed before the clutch is released, the shock is suppressed by realizing the smooth clutch operation with good responsiveness by suppressing the occurrence of surge pressure of the hydraulic pressure. Further, at the time of clutch engagement shift, a pump injection force is increased in the range in which the pump injection amount does not become lower than the predetermined lower limit. Since the amount of the hydraulic oil to be supplied to the HST motor 10a whose power is transmitted to the output shaft 15 is secured before the clutch is engaged, the shock is suppressed by realizing the smooth clutch operation by suppressing the abrupt variation of the hydraulic pressure.

Detail of Clutch Control (Release Control and Engagement Control)

Figure 5:
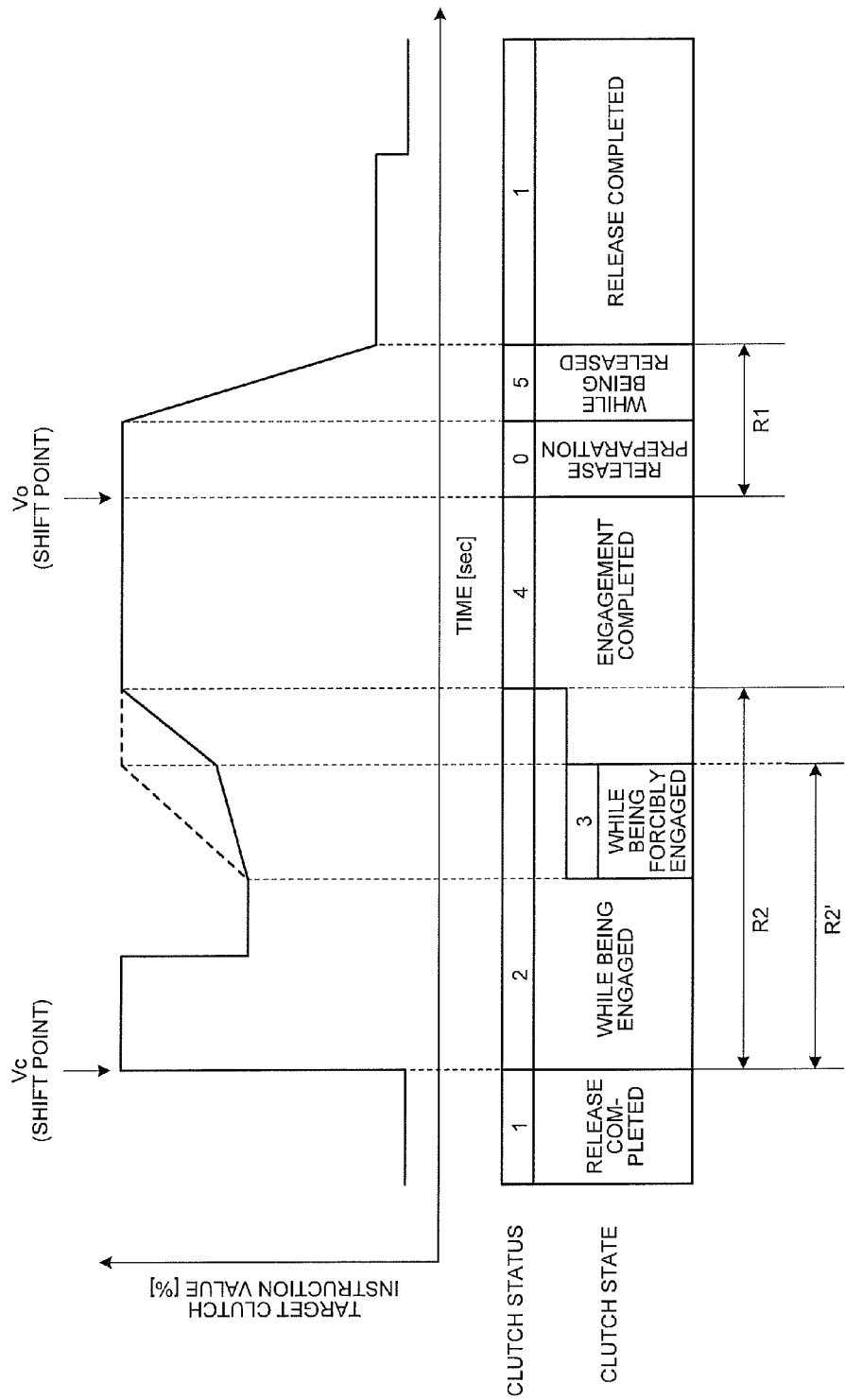
FIG. 5 is an explanatory view explaining a clutch status.

Here, the clutch control (release control and engagement control) and the pump injection amount control described above are executed using a concept of a clutch status. As illustrated in FIG. 5, the clutch status has six types of definition of statuses, and when the clutch status is "0", the clutch status is "release preparation", when the clutch status is "1", the clutch status is "release completed", when the clutch status is "2", the clutch status is "while being engaged", when the clutch status is "3", the clutch status is "while being forcibly engaged", when the clutch status is "4", the clutch status is "engagement completed", and when the clutch status is "5", the clutch status is "while being released". Note that a shift between the clutch statuses, that is, the clutch control (release control and engagement control) is executed by that the HST controller 31 outputs a target clutch instruction value illustrated in FIG. 5. Note that a graph, which illustrates a relation between a time and a target clutch instruction value illustrated in FIG. 5 illustrates FIG. 3(b) and FIG. 4(b) together.

The clutch status of "engagement completed" shows a status in which the clutch 13 is perfectly coupled and the power of the HST motor 10a is transmitted to the output shaft 15, and the target clutch instruction value is 100%. In the clutch status (engagement completed), to release the clutch 13, a shift point (an output shaft speed determined referring to a first map or a second map) is determined by a vehicle status, an accelerator opening degree (throttle amount) (%), a clutch status stay time (a time in which a present clutch status is kept without being changed) which will be described later and the shift point is compared with a detected speed of the output shaft 15 (hereinafter, called an output shaft speed), and when a transition condition which will be described later is satisfied, the clutch status is shifted to "release preparation". Note that a timing of shift of the clutch status becomes a shift point Vo as illustrated in FIG. 5.

The clutch status of "release preparation" is a status indicating a state that, to release the clutch 13, the motor capacity of the HST motor 10a is reduced and reduced up to a certain value (for example, 27%). Here, when the following transition condition is satisfied, the clutch status shifts to "while being released". That is, when a transition condition that the motor capacity of the HST motor 10a is further reduced than the certain value (for example, 27%) as well as a predetermined time passes (the detail of which will be described later) is satisfied, the clutch status is shifted to "while being released".

The clutch status of "while being released" is a status indicating a state that the clutch 13 is released, and the clutch 13 is released by gradually reducing the clutch instruction value from 100% to, for example, 30% (modulation). Note that when the clutch instruction value has become 30%, the clutch status is shifted to "release completed". Note that the clutch instruction value of 30% is only an exemplified numerical value, and the embodiment can be also realized by previously setting other value.

The clutch status of "release completed" is a status indicating a state that the clutch instruction is set to 0% to detect failure (to detect powering of a clutch solenoid of the clutch control valve 14). Note that, in the clutch status of "release completed", when a detected output shaft speed is equal to or more than a certain speed as well as a vehicle speed stage is a third speed stage or a fourth speed stage, the clutch instruction value is set to 0%. Further, when the detected output shaft speed becomes equal to or less than other speed, the clutch instruction value is set to, for example, 30%. Note that, in the state of the clutch status of "release completed", the clutch status shifts in the following transition condition (the detail of which will be described later). That is, to engage the clutch 13, the shift point (output shaft speed determined referring to the first map or the second map) is determined by the vehicle status, the throttle output amount (%), and the clutch status stay time, and when a detect output shaft speed is lower than the shift point, the clutch status is shifted to "while being engaged". That is, a timing of shift of the clutch status becomes a shift point Vc as illustrated in FIG. 5. Note that the clutch instruction value of 30% is only an exemplified numerical value, and the embodiment can be also realized by previously setting other value.

The clutch status of "while being engaged" is a status indicating a state that the clutch instruction value is varied to engage the clutch 13. Note that, in state of the clutch status of "while being engaged", the clutch status shifts in the following transition condition (the detail of which will be described later). That is, when the vehicle speed of the wheel loader 50 is increased and a detect output shaft speed is equal to or more than a certain speed as well as the vehicle speed stage is the third speed stage or the fourth speed stage, the clutch status shifts to "release completed". Further, as illustrated in FIG. 5, when a predetermined ordinary engagement finish time R2 (refer to FIG. 5) has passed and the clutch instruction value has become 100% after the clutch status had become "while being engaged", the clutch status shifts to "engagement completed". Further, when a predetermined transition condition (the detail of which will be described later) has been satisfied at the time the clutch 13 is caused to execute an engagement operation, the clutch 13 executes an engagement operation called a forcible engagement. The clutch status shifts from "while being engaged" to the clutch status "while being forcibly engaged" which will be described later. Here, an object of the engagement operation of the clutch 13 called the forcible engagement will be explained. Ordinarily, while the clutch 13 is being engaged, the clutch 13 executes the engagement operation receiving the clutch instruction value as illustrated in a solid line of FIG. 5. However, when the wheel loader 50 travels at a predetermined speed or less (in particular, at a speed or less such as when the wheel loader 50 travels at a low speed), there is a possibility that the operator has uncomfortable feeling as if the wheel loader 50 is stopped by a shock when the clutch 13 is engaged. Further, there is a case that when the wheel loader 50 has reached uphill with material loaded in the bucket 53, it is desired to get traction by causing the clutch 13 being released to promptly execute the engagement operation. In the case described above, in an ordinary engagement, the clutch 13 executes the engagement operation during an ordinary engagement time R2 illustrated in FIG. 5. However, when a determination is executed by setting a transition condition for shifting the clutch status in "while being engaged" to "while being forcibly engaged", the clutch 13 is caused to execute the engagement operation (forcible engagement) in a time shorter than the ordinary engagement time R2 (refer to FIG. 5). That is, a time necessary to the forcible engagement which is defined as a forcible engagement time R2' (refer to FIG. 5) is a time shorter than the ordinary engagement time R2.

The clutch status of "while being forcibly engaged" is a status indicating a state that the clutch instruction value is increased up to 100% from the target clutch instruction value at the time the clutch status has been shifted to "while being forcibly engaged" at a predetermined ratio (refer to a broken line of FIG. 5). Note that when the vehicle speed of the wheel loader 50 increases while the clutch status is "while being forcibly engaged" and the following transition condition (the detail of which will be described later) is satisfied, the clutch status shifts to "release completed". That is, when the output shaft speed is equal to or more than a certain speed as well as the vehicle speed stage is the third speed stage or the fourth speed stage, the clutch status shifts to "release completed". Otherwise, when the following transition condition (the detail of which will be described later) is satisfied, the clutch status shifts to "engagement completed". When the clutch instruction value has reached 100% while the clutch status is the status of "while being forcibly engaged", the clutch status is shifted to "engagement completed". That is, when the forcible engagement time R2' illustrated in FIG. 5 has passed and the clutch instruction value has been increased as in the broken line in FIG. 5 and has reached 100%, the clutch status is shifted to "engagement completed".

Note that, in the clutch statuses, a period obtained by adding release preparation "0" and while being released "5" is defined as a release shift time R1 (refer to FIG. 5) and corresponds to a time (shift-to-release time) in which the clutch 13 executes a preparation for release and a release operation. Further, in the clutch statuses, while being engaged "2" is defined as the ordinary engagement time R2 as described above which corresponds to a time in which the clutch 13 executes the engagement operation (at the time of shift to engagement). Otherwise, the forcible engagement time R2' that is a period of while being forcibly engaged "3" corresponds to the time in which the clutch 13 executes the engagement operation (at the time of shift to engagement).

Figure 6:
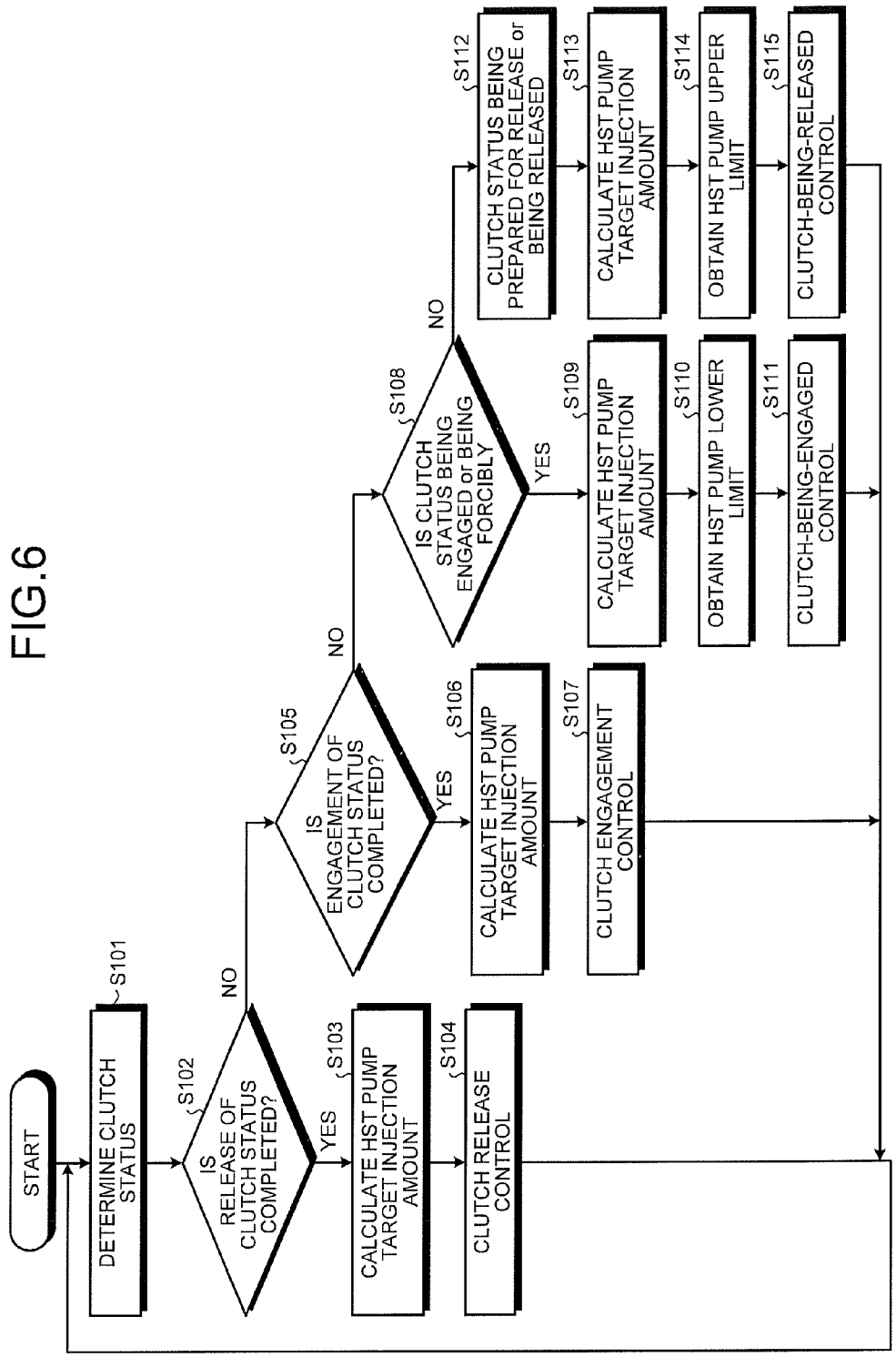
FIG. 6 is a flowchart illustrating a clutch control procedure and a pump injection amount control procedure executed by an HST controller based on the clutch status.

The clutch control (release control and engagement control) and the pump injection amount control executed by the HST controller 31 will be explained referring to a flowchart illustrated in FIG. 6. First, the HST controller 31 determines which clutch status in the clutch statuses described above is employed at present (step S101). Thereafter, the HST controller 31 determines whether or not the present clutch status is "release completed" (step S102). When the clutch status is "release completed" (step S102: Yes), the HST controller 31 further calculates a target injection amount of the HST pump 4 (step S103). Then, a signal for instructing the swash plate angle (pump instruction value) is output to the pump control valve 5 of the HST pump 4 to achieve the target injection amount and the pump injection amount control is executed as well as a signal for keeping the released state of the clutch 13 (clutch instruction value) is output to the clutch control valve 14 of the clutch 13 to thereby execute the clutch release control (step S104), and the process goes to step S101.

In contrast, when the clutch status is not "release completed" (step S102: No), the HST controller 31 further determines whether or not the clutch status is "engagement completed" (step S105). When the clutch status is "engagement completed" (step S105: Yes), the HST controller 31 further calculates the target injection amount of the HST pump 4 (step S106). Then, the HST controller 31 executes the pump injection amount control by outputting the pump instruction value so that the target injection amount is achieved as well as executes the clutch engagement control by outputting the clutch instruction value for keeping the engaged state of the clutch 13 (step S107), and thereafter the process goes to S101.

In contrast, when the clutch status is not "engagement completed" (step S105: No), the HST controller 31 further determines whether or not the clutch status is "while being engaged" or "while being forcibly engaged" (step S108). When the clutch status is "while being engaged" or "while being forcibly engaged" (step S108: Yes), the HST controller 31 further calculates the target injection amount of the HST pump 4 (step S109). Next, the HST controller 31 obtains the lower limit of the pump instruction value of the HST pump 4 (step S110). Then, as illustrated in FIG. 4, the HST controller 31 executes the pump injection amount control by outputting the pump instruction value so that the target injection amount is achieved under the restriction of the lower limit as well as executes clutch-being-engaged control by outputting a clutch instruction value for engaging the clutch 13 (step S111), and thereafter the process goes to step S101. As illustrated in FIG. 4, the clutch-being-engaged control unit control integrating three controls, i.e., motor capacity control to the HST motors 10a, 10b, the clutch control to the clutch 13, and the pump injection amount control to the HST pump 4 which are executed from time t11 to the t12. A time of the clutch-being-engaged control which is executed from time t11 to time t12 corresponds to the ordinary engagement finish time R2 illustrated in FIG. 5.

In contrast, when the clutch status is not "while being engaged" or "while being forcibly engaged" (step S108: No), the clutch status is "release preparation" or "while being released" (step S112), and the target injection amount of the HST pump 4 is calculated (step S113). Further, the HST controller 31 obtains the upper limit of the pump instruction value of the HST pump 4 (step S114). Then, as illustrated in FIG. 3, the pump injection amount control is executed by outputting the pump instruction value so that the target injection amount is achieved under the restriction of the upper limit as well as while-clutch-being-released control is executed by outputting a clutch instruction value for releasing the clutch 13 (step S115), and thereafter the process goes to step S101. As illustrated in FIG. 3, the while-clutch-being-released control unit control in which three controls, i.e., the motor capacity control to the HST motors 10a, 10b, the clutch control to the clutch 13, and the pump injection amount control to the HST pump 4 that are executed from time t1 to time t3 are integrated. A time of the while-clutch-being-released control executed from time t1 to t3 corresponds to the release shift time R1 illustrated in FIG. 5.

That is, at step S111, the control (clutch-being-engaged control) at the time of clutch engagement shift is executed between time t11 to time t12 of FIG. 4, and at step S115, the control (while-clutch-being-released control) at the time of clutch release shift is executed between time t1-time t3 of FIG. 3.

Figure 7:
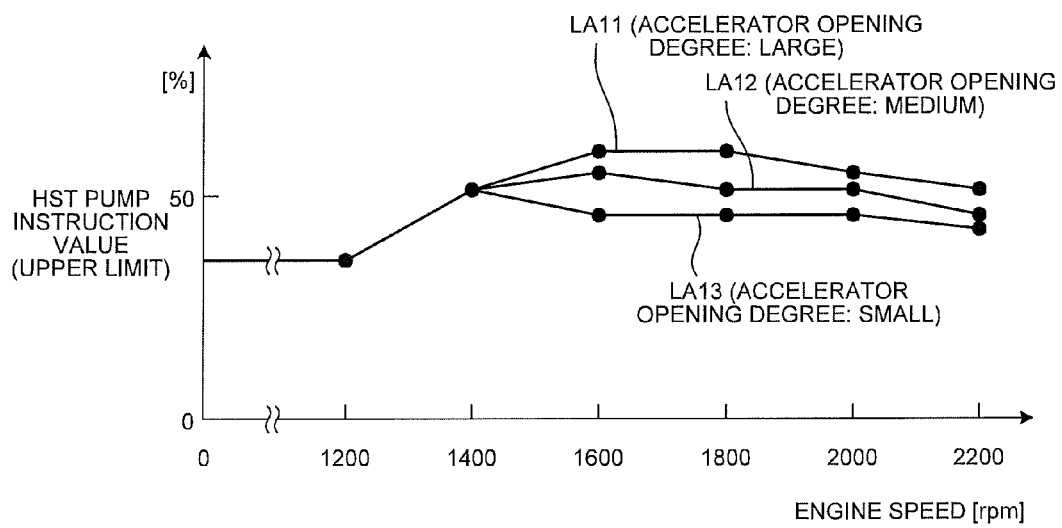
FIG. 7 is a graph illustrating an upper limit of an HST pump instruction value corresponding to a vehicle load at the time of clutch release shift.
Figure 8:
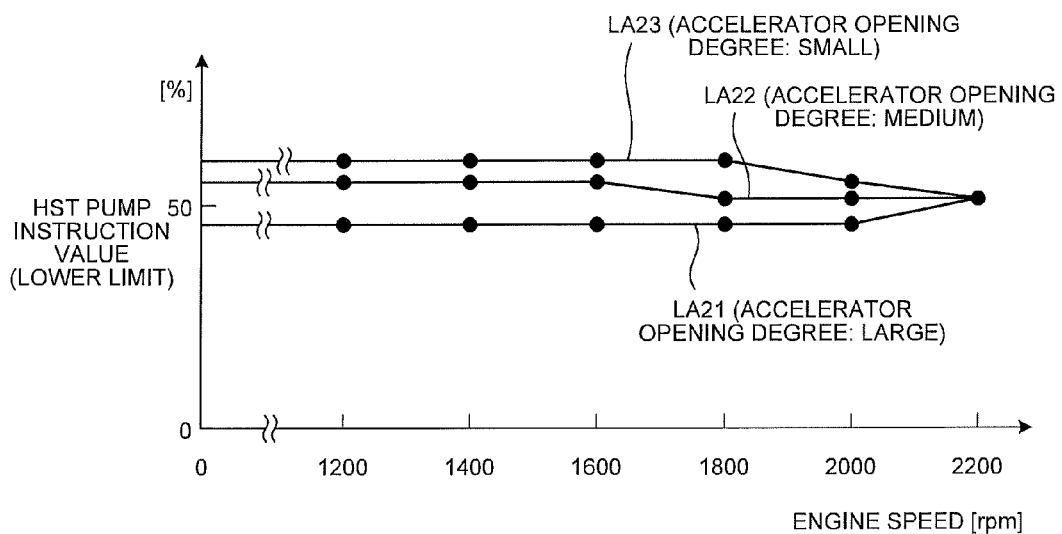
FIG. 8 is a graph illustrating a lower limit of the HST pump instruction value according to the vehicle load at the time of clutch engagement shift.

Next, a method of determining the upper limit or the lower limit of the pump instruction value will be explained. FIG. 7 and FIG. 8 are views illustrating the upper limit or the lower limit of the pump instruction value according to the accelerator opening degree to the engine speed. Here, the upper limit of the pump instruction value obtained at step S114 is obtained referring to data of a graph illustrated in FIG. 7. The data of the upper limit is previously stored in a storage device such as the memory of the HST controller 31. Further, the lower limit of the pump instruction value obtained at step S110 is obtained referring to data of a graph illustrated in FIG. 8. The data of the lower limit is previously stored in the storage device such as the memory of the HST controller 31. The upper limit or the lower limit of the data of the graphs illustrated in FIG. 7 and FIG. 8 are previously set corresponding to the load of the working vehicle (in the embodiment, the wheel loader 50) determined by the engine speed and the accelerator opening degree. Note that the data of the graphs illustrated in FIG. 7 and FIG. 8 are the upper limit or the lower limit of the pump instruction value and are not a value indicating the load. Curves LA11, LA21 in FIG. 7, FIG. 8 illustrate a time when the accelerator opening degree is large, for example, when the accelerator opening degree is 90% or more, curves LA12, LA22 illustrate a time when the accelerator opening degree is medium, for example, when the accelerator opening degree is 70%, and curves LA13, LA23 illustrate a time when the accelerator opening degree is small, for example, when the accelerator opening degree is 50% or less. Further, the data of the graphs illustrated in FIG. 7, FIG. 8 are set differently depending on a type and a vehicle specification of the working vehicle. Since the motor capacity control, the clutch control, and the pump injection amount control are executed by previously setting the upper limit or the lower limit of the pump instruction value (pump injection amount) as described above and selecting the upper limit or the lower limit according to the load of the working vehicle, a suppress or an increase of the pump injection amount is certainly and appropriately controlled at the time of clutch release shift or at the time of clutch engagement shift.

Figure 9:
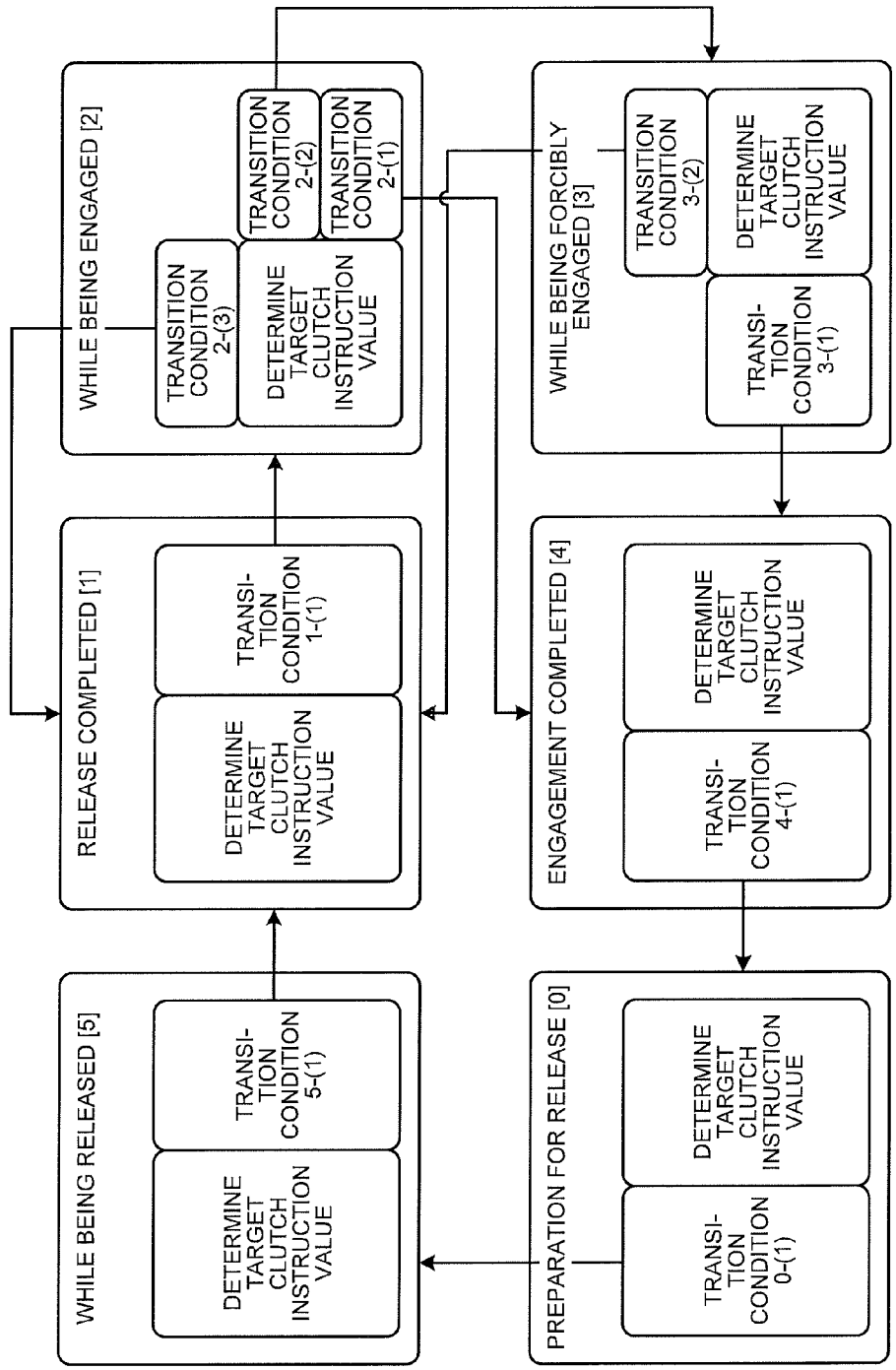
FIG. 9 is a view illustrating transition conditions of clutch statuses.

As explained using FIG. 5 and the like, the clutch status has the six types of the clutch statuses, the clutch statuses are shifted when a condition called the transition condition is satisfied. The transition condition will be explained in detail. FIG. 9 illustrates transition conditions of the clutch statuses. Although the respective clutch statuses are explained using FIG. 5, when the respective transition conditions are satisfied in the respective clutch statuses, the clutch statuses are transited.

Figure 11:
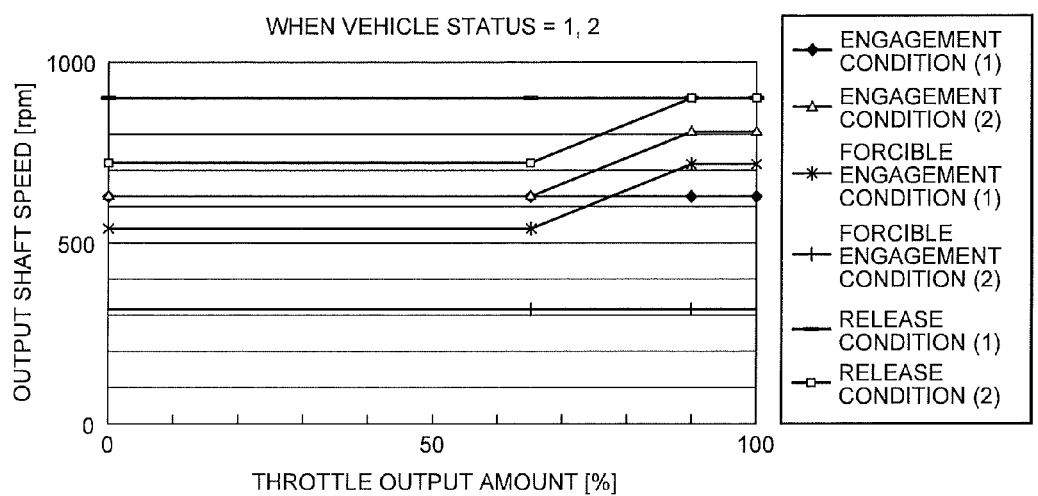
FIG. 11 is a graph illustrating the vehicle status transition condition when the vehicle status is "1" or "2".

Transition Condition 1-(1): When Clutch Status Shifts from Release Completed to while being Engaged A transition condition when the clutch status "1" of release completed shifts to the clutch status "2" of while being engaged will be explained. When a condition of equal to or less than an output shaft speed of a certain threshold value (engagement condition (1)) is satisfied at the time less than one second has passed after the clutch status had become "1", the clutch status "1" shifts to the clutch status "2". Here, the output shaft speed of the certain threshold value is an output shaft speed determined referring to a graph illustrated in FIG. 11. That is, the output shaft speed of threshold value is determined from the accelerator opening degree (throttle output amount) detected by the accelerator opening degree sensor 33 using the graph corresponding to the engagement condition (1). In contrast, a time in which the clutch status continues the same clutch status (less than one second after the clutch status has become "1" as described above) is measured by a counter and the like. Further, when a condition of equal to or more than an output shaft speed of a certain threshold value (engagement condition (2)) is satisfied at the time equal to or more than one second has passed after the clutch status had become "1", the clutch status "1" shifts to the clutch status "2". Also here, the output shaft speed of the certain threshold value is an output shaft speed determined referring to a graph of the engagement condition (2) illustrated in FIG. 11.

Transition Condition 2-(2): When Clutch Status Shifts from while being Engaged to while being Forcibly Engaged A transition condition when the clutch status "2" of while being engaged shifts to the clutch status "3" of while being forcibly engaged will be explained. A condition of equal to or less than an output shaft speed of a certain threshold value at the time of high load (forcible engagement condition (1)) is satisfied, the clutch status "2" shifts to the clutch status "3". Also here, the output shaft speed of the certain threshold value is determined referring to a graph of the forcible engagement condition (1) illustrated in FIG. 11. Further, the state at the time of the high load means the following state. That is, the state is such a state that the vehicle speed sensor 36 detects that the hydraulic oil pressure (HST pressure) detected by the HST pressure sensor 37 is equal to or more than a previously prescribed value, the vehicle status is neither an FR shuttle nor an RF shuttle, a predetermined time (for example, 0.3 second) has passed after the clutch status has becomes "while being engaged", and a prescribed amount of speed is reduced from the output shaft speed when the crutch has become "while being engaged". That is, the case that when the wheel loader 50 has reached uphill with material loaded in the bucket 53 as described above, it is desired to get traction by causing the released clutch 13 to promptly execute the engagement operation corresponds to the state at the time of the high load. Further, a condition of equal to or less than an output shaft speed of a certain threshold value at the time of shuttle or at the time of low load and (forcible engagement condition (2)) is satisfied, the clutch status "2" of while being engaged shifts to the clutch status "3" of the forcible engagement. Here, the output shaft speed of the certain threshold value is determined referring to a graph of the forcible engagement condition (2) illustrated in FIG. 11. Further, the state at the time of shuttle or at the time of the low load means the following state. It is at the time of shuttle when the wheel loader 50 which travels forward switches the forward travel to a backward travel without perfectly stopping the forward travel or when the wheel loader 50 which travels backward switches the backward travel to a forward travel without perfectly stopping the backward travel to load material into the bucket 53. That is, the term "at the time of shuttle" is the vehicle status "3" or "4" which means at the time of shuttle when explained as to a vehicle status which will be described later.

Figure 12:
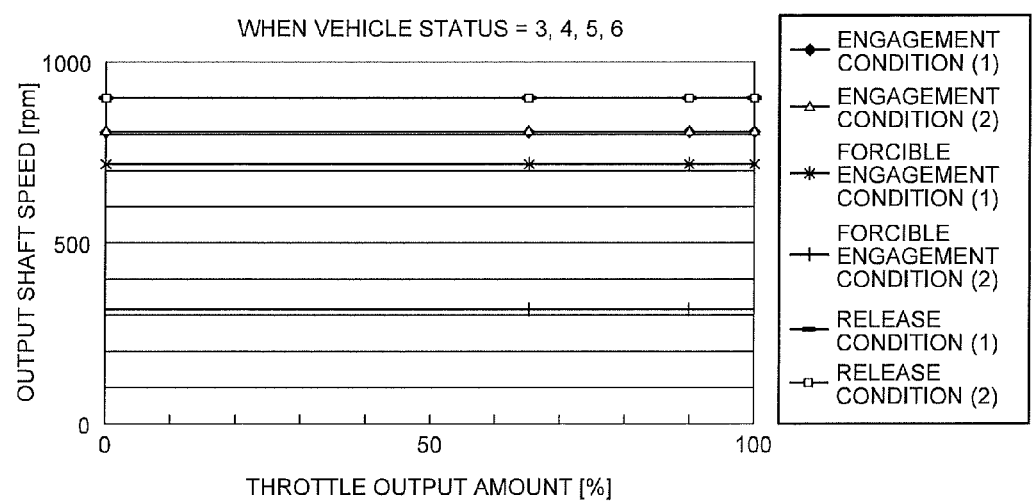
FIG. 12 is a graph illustrating the vehicle status transition condition when the vehicle status is "3" to "6"

Transition Condition 4-(1): When Clutch Status Shifts from Engagement Completed to Release Preparation A transition condition when the clutch status "4" of engagement completed shifts to the clutch status "0" of release preparation will be explained. In engagement completed, the clutch instruction value is 100% as illustrated in FIG. 5. Thus, when a condition of equal to or more than a certain output shaft speed at the time of less than two seconds after the clutch status "4" has been achieved (release condition (1)) is satisfied, the clutch status "4" shifts to the clutch status "0". Here, the output shaft speed of the certain threshold value is an output shaft speed determined referring to a graph of the release condition (1) illustrated in FIG. 12. Further, a condition of equal to or more than the output shaft speed of the certain threshold value at the time of equal to or more than two seconds after the clutch status "4" has been achieved (release condition (2)) is satisfied, the clutch status "4" shifts to the clutch status "0". Here, the output shaft speed of the certain threshold value is an output shaft speed determined referring to a graph of the release condition (2) illustrated in FIG. 12.

Transition Condition 2-(1): When Clutch Status Shifts from while being Engaged to Engagement Completed A transition condition when the clutch status "2" of while being engaged shifts to the clutch status "4" of engagement completed will be explained. When the ordinary engage finish time R2 illustrated in FIG. 5 has passed, the clutch status "2" shifts to the clutch status "4."

Transition Condition 2-(3): When Clutch Status Shifts from while being Engaged to Release Completed A transition condition when the clutch status "2" of while being engaged shifts to the clutch status "1" of release completed will be explained. When a condition that a detected output shaft speed is equal to or more than a certain prescribed speed as well as the speed stage is the third speed stage or the fourth speed stage is satisfied, the clutch status is shifted to "1".

Transition Condition 3-(1): When Clutch Status Shifts from while being Forcibly Engaged to Engagement Completed A transition condition when the clutch status "3" of while being forcibly engaged shifts to the clutch status "4" of engagement completed will be explained. When the pump target instruction value has reached 100%, the clutch status "3" shifts to the clutch status "4". As explained above using FIG. 5, this is because when while being forcibly engaged has been achieved while the clutch 13 is being engaged, although the pump instruction value is increased and the pump instruction value is increased to 100% to cause the clutch 13 to promptly execute the engagement operation (refer to a broken line of FIG. 5), when the pump instruction value has reached 100%, the clutch status is shifted to engagement completed.

Transition Condition 3-(2): When Clutch Status Shifts from while being Forcibly Engaged to Release Completed A transition condition when the clutch status "3" of while being forcibly engaged shifts to the clutch status "1" of release completed will be explained. Here, the clutch status is shifted by the same condition as the transition condition 2-(3).

Transition Condition 0-(1): When Clutch Status Shifts from Release Preparation to while being Released A transition condition when the clutch status "0" of release preparation shifts to the clutch status "5" of while being released will be explained. In release preparation, although the clutch instruction value is 100% as illustrated in FIG. 5, the motor instruction value is reduced as illustrated in FIG. 3. When a predetermined time (for example, 0.01 second) has passed after the motor instruction value had become equal to or less than a certain value (for example, 27%), the clutch status is shifted.

Transition Condition 5-(1): When Clutch Status Shifts from while being Released to Release Completed A transition condition when the clutch status "5" of while being released shifts to the clutch status "1" of release completed will be explained. In while being released, although the clutch instruction value is reduced at a predetermined ratio as illustrated in FIG. 5, when the clutch instruction value has become equal to or less than a certain value (for example, 30%), clutch status is shifted.

Next, the vehicle status will be explained. As illustrated in FIG. 10, the vehicle status has seven types of statuses, i.e., while being stopped "0", forward "1", backward "2", FR shuttle "3", RF shuttle "4", forward N stop "5", and backward N stop "6". A present vehicle status (vehicle status at present) of the vehicle status is a next vehicle status determined from a previous status of the working vehicle. That is, the next vehicle status is determined depending on information of four elements, i.e., the present vehicle status, a position of the forward/backward travel switch lever 34, a rotation direction detected by the vehicle speed sensor 36, and the output shaft speed. The position of the forward/backward travel switch lever 34 has three types of positions, i.e., forward "F", backward "R", and neutral "N". The forward/backward travel switch lever 34 determines its position by being operated by the operator. That is, when the wheel loader 50 is caused to travel forward, the forward/backward travel switch lever 34 is operated to forward "F", when the wheel loader 50 is caused to travel backward, the forward/backward travel switch lever 34 is operated to backward "R", and when the wheel loader 50 is stopped by idling the engine 1, the forward/backward travel switch lever 34 is operated to neutral "N". The position of the forward/backward travel switch lever 34 is electrically detected by a contact point switch, and forward "F", backward "R", and neutral "N" are obtained as operation-selected forward/backward data.

The present state of while being stopped is a state in which the wheel loader 50 does not travel, the present state of forward is a state in which the wheel loader 50 travels forward, and the present state of "backward" is a state in which the wheel loader 50 travels backward. Further, the vehicle state of FR shuttle is a state in which the wheel loader 50 is instantly switched from forward travel to backward travel, and the vehicle state of RF shuttle is a state in which the wheel loader 50 is instantly switched from backward travel to forward travel. The vehicle state of forward N stop is a state in which the forward/backward travel switch lever 34 is operated to neutral while traveling forward. Further, the vehicle state of backward N stop is a state in which the forward/backward travel switch lever 34 is operated to neutral while traveling backward.

When it is detected that the rotation direction detected by the vehicle speed sensor 36 is a direction in which the wheel loader 50 is caused to travel forward, "F" is obtained as data of a vehicle speed sensor rotation direction, whereas when it is detected that the rotation direction is a direction in which the wheel loader 50 is caused to travel backward, "R" is obtained as the data of the vehicle speed sensor rotation direction. Further, as illustrated in FIG. 10, whether or not the output shaft speed detected by the vehicle speed sensor 36 is larger than preset threshold values (Vzero, Vs) depending on the present vehicle status and operator-selected forward/backward travel data. The threshold value Vzero is a value for determining whether or not the wheel loader 50 stops and is a value of the output shaft speed near to 0 (rpm). Further, the threshold value Vs is a value larger than Vzero. When the wheel loader 50 executes a shuttle operation, the threshold value Vs is used to determine whether or not the next vehicle status must be set to while being stopped "0". In the shuttle operation, the output shaft speed has a certain amount of value just after switching to instantly switch the forward travel and the backward travel. Thus, the next vehicle status is determined using a logical add which will be described later by setting the two threshold values, i.e., not only the threshold value Vzero but also the threshold value Vs.

A transition condition from the present vehicle status to the next vehicle status is determined using a logical add (OR) of a condition A which is a logical product (AND) of the position of the forward/backward travel switch lever 34 (operator-selected forward/backward travel data), the data of the vehicle speed sensor rotation direction, and data of the output shaft speed and a condition B which is the output shaft speed. The vehicle status can be obtained by monitoring the condition A and the condition B relating to the transition condition at all times.

"The output shaft speed as the threshold value" (the output shaft speed of the certain threshold value described above) which is necessary to cause the clutch status to transit is determined by the vehicle status obtained as described above and the accelerator opening degree (throttle output amount) detected by the accelerator opening degree sensor 33. That is, when the vehicle status is forward "1" or backward "2", the output shaft speed as the threshold value is determined referring to and using the data of the graphs illustrated in FIG. 11 (hereinafter, called a first map). Further, when the vehicle status is FR shuttle "3", RF shuttle "4", forward N stop "5", and backward N stop "6", the output shaft speed as the threshold value is determined referring to and using the data of the graphs illustrated in FIG. 12 (hereinafter, called a second map). Note that the first map or the second map is previously set according to the throttle output amount (%) to each of the transition conditions of the clutch status (engagement condition (1), engagement condition (2), forcible engagement condition (1), forcible engagement condition (2), release condition (1), and release condition (2)) described above (FIGS. 11 and 12).

Then, when the output shaft speed detected by the vehicle speed sensor 36 is compared with an output shaft speed as a threshold value shown in the first map or the second map and satisfies any of the transition conditions of the clutch status (engagement condition (1), engagement condition (2), forcible engagement condition (1), forcible engagement condition (2), release condition (1), and release condition (2)), the clutch status is caused to shift. As the wheel loader 50, "the output shaft speed as the threshold value" becomes the shift point Vo from the low speed travel to the high speed travel or the shift point Vc from the high speed travel to the low speed travel. The shift point Vo becomes a point at which the clutch 13 shifts from the engaged state to the released state, and the shift point Vc becomes a point at which the clutch 13 shifts from the released state to the engaged state. When the vehicle status can be determined using FIG. 10 as described above, the clutch status is determined by referring and comparing the output shaft speed as the threshold value to and with the detected output shaft speed using the first map of FIG. 11 or the second map of FIG. 12. The present clutch status is obtained by monitoring a change of the output shaft speed and the like. Then, the pump injection amount control and the clutch control (release control and engagement control) according to the clutch status is executed by determining the present clutch status including step S101 illustrated in FIG. 6 as described above. The embodiment explained above will be summed up using FIG. 13.

That is, in FIG. 13, first, the vehicle status (next vehicle status) is determined (step S201). To determine the vehicle status, as illustrated in FIG. 10, the information of the present vehicle status is obtained, the information of the position of the forward/backward travel switch lever 34 is obtained, and further the information of the rotation direction and the output shaft speed is obtained by the vehicle speed sensor 36.

Further, the information of the accelerator opening degree is obtained by the accelerator opening degree sensor 33 and further the information of the output shaft speed (shift point) according to the vehicle status is obtained (step S202). The information of the output shaft speed (shift point) is obtained from the first map or the second map. Further, the information of the present clutch status is obtained (step S203). Furthermore, the information of the present output shaft speed is obtained by the vehicle speed sensor (step S204).

Thereafter, whether or not the transition condition of the clutch status illustrated in FIG. 9 is established is determined (step S205). Information used in the determination of establishment of the transition condition includes the following information.

(1) Present clutch status information
(2) Present output shaft speed information
(3) Information of output shaft speed (shift point)
(4) Passed time
(5) Information of HST pressure detected by HST pressure sensor
(6) Present vehicle speed stage of working vehicle
(7) Information of present vehicle status
(8) Information of present pump instruction value Note that whether or not the transition condition is established is determined using a single or plural items of information shown in (1) to (8) depending on the transition condition.

Thereafter, the clutch status is transited based on a result of determination of the establishment of the transition condition at the step S205 (step S206). Then, the control illustrated in the flowchart of FIG. 6 is executed (step S207). That is, the clutch control (engage control/release control), the pump injection amount control of the HST pump 4, and the motor capacity control of the HST motors 10a, 10b are executed. Thereafter, the process goes to step S210 and repeatedly executes the processes described above.

Modification

In the embodiment described above, although the load of the working vehicle is determined based on the engine speed and the accelerator opening degree, the load of the working vehicle may be determined based on the engine speed and an intake manifold pressure. It is to indirectly detect a load state of the engine 1 to detect the accelerator opening degree. Thus, when a pressure of air passing through an intake manifold (intake manifold pressure) in an intake manifold which is a path through which air is sucked into the engine 1 is detected using a pressure sensor, since the load state of the engine 1 is directly detected, the load of the working vehicle can be detected stably as well as accurately. As a result, the clutch status can be transited with a high accuracy, thereby the clutch control (release control and engagement control) can be executed with a high accuracy.

In the embodiment, the control for suppressing the pump injection amount under the restriction of the upper limit of the pump instruction value at the time of clutch release shift and the control for increasing the pump injection amount under the restriction of the lower limit of the pump instruction value at the time of clutch engagement shift. Therefore, according to the control apparatus and the control method of the embodiment, a smooth clutch operation can be executed suppressing a shock at the time of engagement or release of the clutch 13 also to a design in which a large gear shift ratio is required because the HST motors 10a, 10b are reduced in size and further to a design in which a large amount of pump absorption torque is required because a performance of the engine 1 is improve. As a result, good driving feeling is given to the operator and it is not necessary to apply a special countermeasure for improving durability to the clutch, the hydraulic equipment, and the like of the working vehicle. Accordingly, a new design and a change of design of the working vehicle such as the wheel loader 50 can be coped with promptly as well as easily.

Reference Signs List 1 engine
1a engine speed sensor
1b fuel injection device
2 working machine hydraulic pump
3 charge pump
4 travel hydraulic pump (HST pump)
5 pump control valve
6 pump capacity control cylinder
7, 8 high pressure relief valve
9 low pressure relief valve
10a, 10b travel hydraulic motor (HST motor)
11a, 11b motor control electronic servo valve
12a, 12b motor cylinder
13 clutch
14 clutch control valve
15 output shaft
19a working machine hydraulic cylinder (lift cylinder)
19b working machine hydraulic cylinder (bucket cylinder)
20 HST circuit
30 vehicle body controller
31 HST controller
32 engine controller
33 accelerator opening degree sensor
33a accelerator pedal
34 forward/backward travel switch lever
36 vehicle speed sensor
37 HST pressure sensor
50 wheel loader

The invention claimed is:

1. A control apparatus of a working vehicle comprising a hydraulic circuit which is a closed circuit having a hydraulic pump driven by an engine and two hydraulic motors and in which the two hydraulic motors are connected in parallel to the hydraulic pump, a clutch being released or engaged so that a power is transmitted to an output shaft of one of the hydraulic motors via the clutch in the working vehicle, the working vehicle traveling by a drive force of the one or two hydraulic motors, the control apparatus comprising:

a load detection unit configured to determine a working vehicle load of the working vehicle from a throttle output amount and an engine speed of the engine; and a control unit configured to execute control for reducing a pump injection amount of the hydraulic pump under a restriction of an upper limit injection amount of the hydraulic pump predetermined based on the working vehicle load determined by the load detection unit at a time of release shift control of the clutch and execute control for increasing a pump injection amount of the hydraulic pump under a restriction of a lower limit injection amount of the hydraulic pump predetermined based on the working vehicle load determined by the load detection unit at a time of engagement shift control of the clutch.

2. The control apparatus of the working vehicle according to claim 1, wherein the working vehicle load is determined based on the engine speed and an accelerator opening degree or an intake manifold pressure.

3. The control apparatus of the working vehicle according to claim 1, wherein the control unit determines the time of release shift control and the time of engagement shift control of the clutch based on a clutch status indicating a clutch state including a released state, a while-being-released state, an engaged state, and a while-being-engaged state of the clutch.

4. The control apparatus of the working vehicle according to claim 3, wherein the clutch status transits based on a vehicle status indicating a transition of a travel state of the working vehicle and a speed of the output shaft determined based on an accelerator opening degree.

5. A control method of a working vehicle comprising a hydraulic circuit which is a closed circuit having a hydraulic pump driven by an engine and two hydraulic motors and in which the two hydraulic motors are connected in parallel to the hydraulic pump, a clutch being released or engaged so that a power is transmitted to an output shaft of one of the hydraulic motors via the clutch in the working vehicle, the working vehicle traveling by a drive force of the one or two hydraulic motors, the control method comprising:

determining a working vehicle load of the working vehicle from a throttle output amount and an engine speed of the engine; and executing control for reducing a pump injection amount of the hydraulic pump under a restriction of an upper limit injection amount of the hydraulic pump predetermined based on the working vehicle load determined at a time of release shift control of the clutch and executing control for increasing a pump injection amount of the hydraulic pump under a restriction of a lower limit injection amount of the hydraulic pump predetermined based on the working vehicle load determined at a time of engagement shift control of the clutch.

6. The control method of the working vehicle according to claim 5, wherein the working vehicle load is determined based on the engine speed and an accelerator opening degree or an intake manifold pressure.

* * * * *